April 28, 1925.
C. ROCHE
VEHICLE WHEEL
Filed Dec. 6, 1922
1,535,497
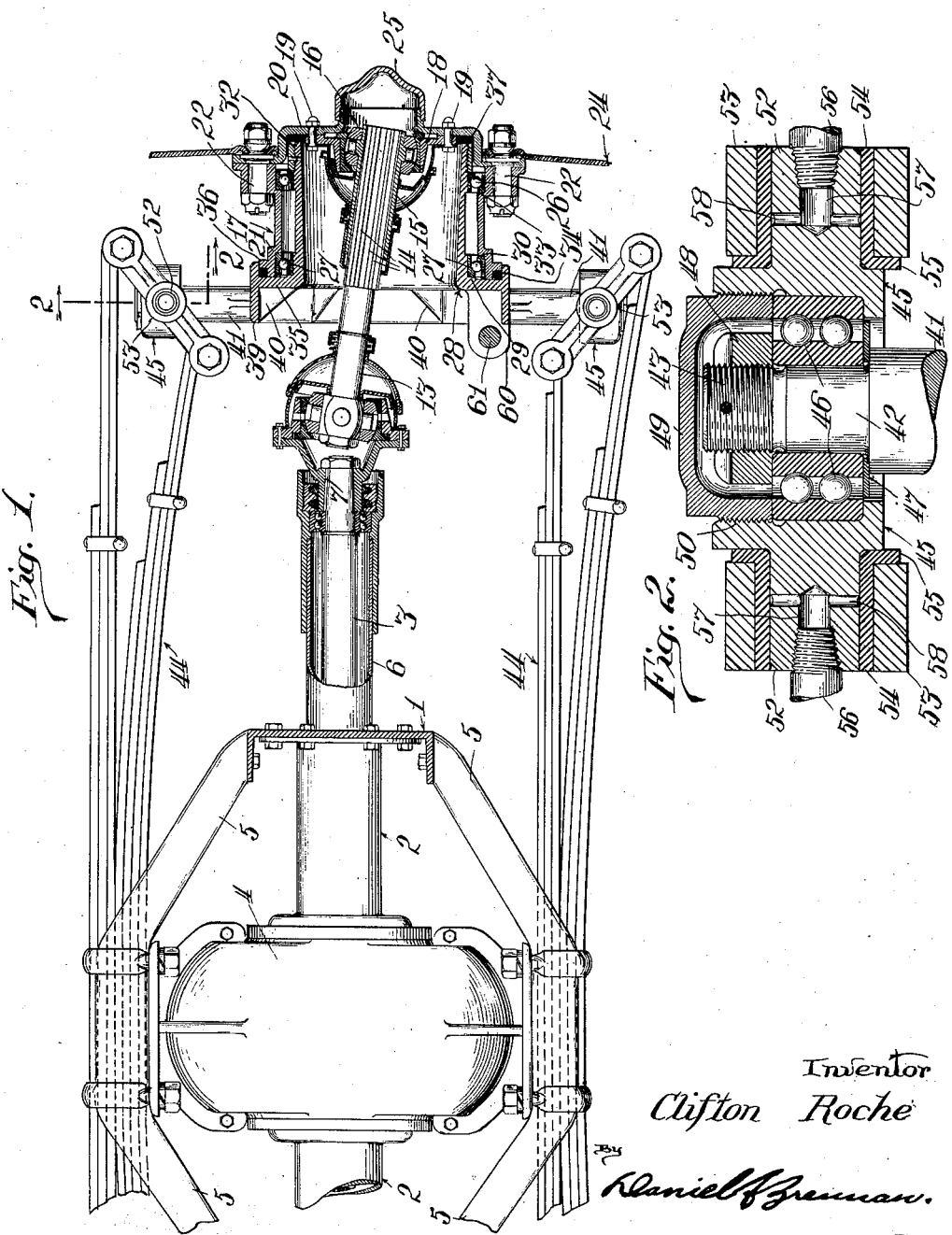
Inventor
Clifton Roche
By Daniel F Brennan
Attorney Patented Apr. 28, 1925.

1,535,497

UNITED STATES PATENT OFFICE.

CLIFTON ROCHE, OF CHICAGO, ILLINOIS.

VEHICLE WHEEL.

Application filed December 6, 1922. Serial No. 605,257.

*To all whom it may concern:*

Be it known that I, CLIFTON ROCHE, a citizen of the United States, residing at Chicago, county of Cook, and State of Illinois, have invented new and useful Improvements in Vehicle Wheels, of which the following is a specification.

This invention relates to improvements in vehicle wheels, and particularly to improvements in wheels which are positively driven from an engine or prime mover and which at the same time are used as steering wheels of the vehicle. Wheels of this character are by way of example described in my copending application Serial No. 514,248 of November 10, 1921, and the present invention is a modification of the steering wheel construction disclosed therein.

It is an object of the invention to arrange a positive drive for a steering wheel with respect to two universal joints transmitting the drive in such manner that the pivot center or steering axis of the wheel is located at some point between the two universal joints.

It is also an object of the invention to provide a wheel of this character in which, owing to the arrangement of a double universal joint, any angular movement of the wheel relatively to the drive shaft is accompanied by an angular movement of the intermediary universal joint shaft, which also is angularly displaced thereby.

It is also an object of the invention to provide a wheel of this character in which the road shocks and the spring action of the vehicle are absorbed by the two joints so as to relieve the strain which might be excessive if it would act on a single joint only. In spite of this connection between the two universal joints, the interposition of the slip joint will facilitate the steering of the wheel.

It is furthermore an object of the invention to improve the hub structure of a wheel of this character by providing additional bearings interposed between the wheel hub proper and the supporting structure for the hub so as to distribute more uniformly and more advantageously the strain which must occur during the driving relation, and particularly when shocks are encountered during the travel of the vehicle.

With these and other objects in view, an embodiment of the improvement is illustrated in the accompanying drawings and is described in the following specification.

In the drawings:

Fig. 1 is a side elevation and partly section through the central portion of a wheel construction and wheel support of this kind, and Fig. 2 is an enlarged sectional view on line 2—2 of Fig. 1.

A portion only of the vehicle frame is indicated by the longitudinal sill 1 with which the tubular casing 2 for the divided driving shaft 3 is united by a flange or the like. This frame also serves for supporting a casing 4 in which the differential or any other form of transmission gearing suitable for these purposes, may be located, this casing being also in communication with the tubular element 2. The brackets 5 extending from the longitudinal sill to the casing serve for maintaining the latter rigidly in position.

The driving shaft 3, which also passes through the extension 6 of the tubular casing 2, is connected at its end by a key 7 with a universal joint of a structure similar to that described in the above mentioned copending application Serial No. 514,248. The detail construction of this universal joint is not of great importance for the present invention. Any universal coupling adapted to transmit the rotation of the driving member 3 to the intermediate shaft or extension 13 and adapted to maintain this driving relation regardless of the angular position of the intermediate shaft 13 to the main shaft 3, may be used.

The opposite end of the intermediate shaft 13 is provided with a plurality of longitudinal keyways or grooves 14 on which a tubular shaft 15 is mounted so as to be slidable thereon and to be rotatable with the intermediate shaft 13. This tubular shaft 15 constitutes together with the shaft 13 the slip joint between the first named universal joint and the universal joint 16, which is of similar construction to the other joint. Regardless of the angular relation of the intermediate shaft 13 this driving relation between the shaft 3 and the hub 17 will be maintained. It is also obvious that owing to this arrangement, and owing to the insertion of the slip joint 15 between the two universal joints, a longitudinal displacement of the universal joint 16 relatively to the first named universal joint may take place without disturbing the driving relation.

The outer element 18 of the second universal joint 16 is united by a plurality of bolts 19 with a flange plate 20, the latter being secured to the sleeve 21 of the wheel hub 17 by a plurality of strong bolts 22 which at the same time are utilized for securing the central portion of a disc wheel 24 to the flange plate 20 and the hub sleeve 21. It is to be noted, however, that this attachment of a metal disc wheel 24 to the steering wheel structure forming the subject of the present invention is shown by way of example only and that the hub 17 may be united with any other form of wheel structure.

A dust cap 25 is secured in a well known way on a threaded extension of the flange plate 20 to prevent the entrance of dust and other foreign particles into the universal joint 16, permitting thereby said universal joint to remain thoroughly lubricated, oil guards being provided at both of the universal joints as described in the copending application.

In order to support the hub sleeve 21 of this wheel structure, a pair of ball bearings 26 and 27 are inserted between the hub 21 and the wheels support 28, which is united with the frame structure of the vehicle itself. This support 28 in the form of a spindle or cylindrical member is of a sufficiently large diameter to permit the intermediate shaft 13 to be adjusted angularly with respect to the driving shaft 3 within extremely wide limits, and as this adjustment of the intermediate shaft 13 with respect to the driving shaft 3 takes in one-half only of the entire possible range of angular adjustment, it is obvious that the complete angular adjustment of the wheel 24 relatively to the driving shaft 3 is extremely wide, thereby permitting the vehicle to be steered on a very short radius and enhancing the flexibility of the entire steering arrangement. The supporting sleeve 28 for the hub 21 has walls tapering towards the outer end of the same and is provided near the inner end with a shoulder 29 which is engaged by the inner race of the ball bearing 26. An outward displacement of the ball bearing is prevented through a shoulder 30 forming a part of the hub 21. The outer end of the spindle 28 is threaded and carries a nut 32, which forms a stop member or shoulder for the inner ball race of the other ball bearing 26, the hub 21 also being provided with a shoulder 33 on which the outer race of the same ball bearing rests. In this way the location of the two bearings for supporting the sleeve 21 is definitely fixed and an axial displacement of either of said bearings or of any of the portions of said bearings is prevented.

The entrance of dust or other impurities into the ball bearings is guarded against owing to the provision of an annular packing 34 which is interposed between a flange 35 of the spindle 28 and an annular enlargement 36 which projects from the hub 21 outwardly. In a similar way a packing ring 37 is interposed between the flange 20 of the hub structure and the free end of the spindle 28.

It is obvious, therefore, that the space between the wheel support 28 and the hub 21 may be filled with a lubricant so as to maintain the hub of the wheel thoroughly lubricated in all of those parts which are subjected to frictional wear and that this lubricant cannot be contaminated or detrimentally affected by the entrance of dust and the like.

In order to establish the connection between the wheel support 28 and the frame 1 of the vehicle, or the body thereof, at the same time however permitting the steering of the wheel, the spindle or support 28 is provided at its rear or open end with an enlarged cylindrical portion 39 which is reinforced by ribs 40. From this extension 39 project at diametrically opposite points the stems 41 to which the connecting means between the frame 1 and the wheel support 28 are secured.

These stems 41 terminate, as indicated in Fig. 2, in reduced portions 42 threaded at their outer ends as indicated at 43. The springs designated as a whole at 44 and interposed between the supporting structure 28 and the frame 1 of the vehicle, are secured at their outer ends to elements which are carried by the stems 41, whereby this connection of yielding nature between the supporting frame 1 and the wheel structure 28 is completed. The connecting elements between the springs 44 and the stems 41 include a collar 45 having an inner diameter sufficiently large to permit of the insertion of thrust ball bearings 46 between the reduced portion 42 of the stems 41 and the collar 45. The ball bearings are held in place against axial movement in one direction of the stems 41 by washers 47 while displacement in the opposite direction is rendered impossible owing to the provision of castellated nuts 48 which are secured on threaded portions 43 of the extensions.

A cap nut 49 engages a tapped extension 50 of the collar 45 and upon tightening the nut 49 the collar 45 will be axially shifted outwardly until a shoulder 47 on the collar engages the outer race of the ball bearing 46 while the opposite end surface of said ball bearing is pressed against the inner edge of the cap nut 49. In this way the stem 41 may be turned within the collar 45 with as little friction as possible, thereby greatly facilitating the steering action of the vehicle.

The connection of the spring structure 44 with the stem 41 is effected through lugs 52, which project at diametrically opposite points from the collar 45 and which serve as supports for shackles 53, to which the ends of the springs are attached. Bronze bushings 54 provided with an annular flange 55 are interposed between the shackles 53 and the lugs 52 of the collar 45 so as to absorb the wear caused by oscillation of the shackles 53 under the influence of the vibrations of the springs. The attachment of the springs to the ends of the shackles may be effected in any suitable way, as for instance by bending the innermost leaf of the springs into an eye shape and inserting a connecting bolt 61 which passes through the shackles 53 and through the eye of the spring. This attachment is not illustrated in the drawing as it is sufficiently well known in the ordinary spring connections.

In the embodiment illustrated two sets of transverse springs are used in connection with each of the stems 41, each set having two main leaves so as to eliminate the danger of an accident in case one of the main leaves breaks. It is obvious, however, that instead of this arrangement of duplicate sets of springs in combination with each of the stems 41, a single set of springs might be secured to a shackle which is rotatably mounted relatively to a part of the wheel support.

The lubrication of the bushings 54 for both of the shackles 53 may be effected through grease cups or the like, whose ends are indicated at 56 and which are disposed so as to discharge the lubricant into axial and transverse bores 57 and 58 respectively. The central portions of the springs 44 may be secured by means of the brackets 5 to the casing 4 or they may be secured in any desired way to other parts of the vehicle (not shown).

A lug 60 projecting from the support 28 near the extension 39 in axial direction serves for the attachment of the steering rod 61 (shown in section only) and through which the wheel support 28 may be turned about the pivot center line of the wheel, this line connecting the stems 41.

The operation of the device will be well understood from the above description. The wheel of which only the disc 24 is shown, is assembled with the hub 21 by the plate 18 and bolts 22. The outer universal joint 14 may then be attached to this plate 20 by means of the bolts 19. The wheel structure comprising the disc 24 and the hub are placed on the spindle 28 on which the ball bearings 25 and 26 have first been mounted. Packings 34 and 37 also have been previously secured in place between the ends of the spindle 28 and the hub structure of the wheel. The entire arrangement is now perfectly fluid-tight so as to retain any lubricant within the chamber deposited by the supporting sleeve 28 and the hub 21. After the ball bearings 46 have been secured in place on the extension 42 and the connecting ring 45 has also been secured in place, the spring structure 44 may be connected with the wheel structure by the shackles 53 so as to retain all of the parts in operative position. Upon removal of the hub cap 25 the outer universal joint 14 becomes accessible for the introduction of a lubricant, as for instance, grease, thereby retaining all of the parts in running condition.

Owing to the arrangement of the two joints the alinement of the parts for proper operation is not disturbed by the road shock or spring action. The joints, if placed as shown, always will be arranged at equal angles with respect to the drive shaft and the axle of the wheel respectively, no matter whether they are out of alinement with the drive shaft or not. This disturbance of the alinement may of course be effected by the spring action or by steering, or by both of these factors; but as two joints combined with a slip joint are inserted the transmission of power from the driving shaft 3 will not be disturbed at any time. Any angular adjustment effected on the first joint will impart a varying angular velocity to its driven shaft but the driven shaft, or shaft driven by the first joint, is the driving shaft for the second joint and as the second joint is automatically adjusted to the same angle relatively to the actual drive shaft 3 as the first joint, this varying angular velocity in the driven shaft is counteracted in the second joint and thereby renders an even flow of power to the wheel parts.

I claim:

1. In a vehicle, a frame, transverse springs, shackles at the ends of said springs, a collar to which said shackles are movably secured, a wheel structure having elements projecting into said collars, and means for turning said elements within said collars.

2. In a vehicle, a frame, springs extending transversely of the frame above and below the same, shackles at the ends of said springs, collars to which said shackles are pivotally secured, a wheel structure, stems on said wheel structure projecting into said collars, anti-friction bearings interposed between said stems and collars, and means for turning said wheel about the axis of said stems.

3. A vehicle, including a frame, a spring extending transversely thereof, a collar, a movable connecting element between said collar and the spring, a pivot on the vehicle wheel extending into the collar and the bearing interposed between said pivot and the vehicle wheel, and means for turning the vehicle wheel about said pivot.

4. In a vehicle, the combination of a frame, duplicate sets of springs extending transversely of the frame and located above and below the frame, the ends of the springs in each set being vertically spaced from each other and being connected by shackles, a collar with which said shackles are rotatably connected, a wheel structure, and pivot stems on said wheel structure extending into said collars.

5. In a vehicle, the combination of a frame, springs extending transversely of the frame above and below the same, a wheel structure having pivots extending in diametrically opposite directions, collars rotatably supported on the ends of said pivot stems, said collars being provided with diametrically opposite lugs, and shackles rotatably mounted on said lugs and connected with the springs.

In testimony whereof I affix my signature in the presence of two witnesses at 36 W. Randolph St., Chicago, Illinois.

CLIFTON ROCHE.

Witnesses:
DANIEL A. BRENNAN,
HELEN G. HOWELL.